United States Patent [19]

Shirn et al.

[11] 4,107,758
[45] Aug. 15, 1978

[54] FUSED OIL FILLED CAPACITOR

[75] Inventors: George A. Shirn, Williamstown; Raynor Linzey, Adams; Carol A. Cushenette, Williamstown, all of Mass.

[73] Assignee: Sprague Electric Company, North Adams, Mass.

[21] Appl. No.: 797,202

[22] Filed: May 16, 1977

[51] Int. Cl.² .............................................. H01G 1/01
[52] U.S. Cl. .................................. 361/275; 361/274; 361/314
[58] Field of Search ................ 361/275, 274, 314, 272

[56] References Cited

U.S. PATENT DOCUMENTS

| | | | |
|---|---|---|---|
| 2,911,504 | 11/1959 | Cohn | 337/296 |
| 3,178,622 | 4/1965 | Paul | 361/275 |
| 3,236,976 | 2/1966 | Rayno | 361/275 X |
| 3,377,510 | 4/1968 | Rayno | 361/314 X |
| 3,909,683 | 9/1975 | Kysezy | 361/274 |

FOREIGN PATENT DOCUMENTS 1,388,052  3/1975  United Kingdom ..................... 361/275

Primary Examiner—E. A. Goldberg
Attorney, Agent, or Firm—Connolly and Hutz

[57] ABSTRACT

An oil filled capacitor has an exothermically alloyable fuse strand within the closed housing that is filled with a dielectric oil. A circuit interruptor means is included within the housing that interrupts a capacitor section to housing terminal connection either in response to overpressure or to overtemperature within the housing, or both. The fuse strand is part of that connection and a portion of the fuse is located at the predetermined point of potential interruption so that any arcing that occurs across the gap of the opened connection will kindle the fuse which in turn will be completely obliterated and quench the arc.

15 Claims, 13 Drawing Figures

U.S. Patent     Aug. 15, 1978     4,107,758
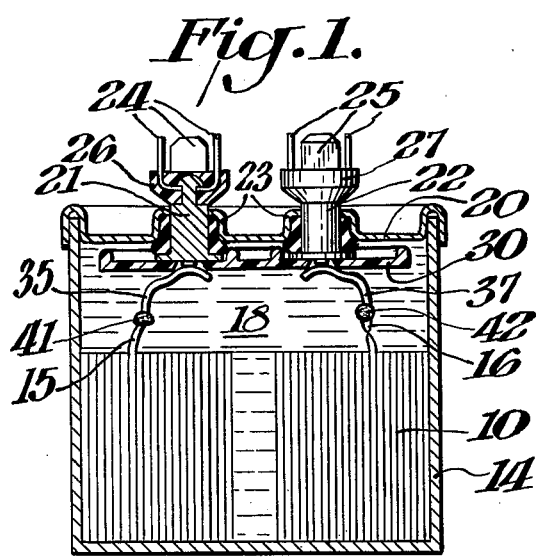
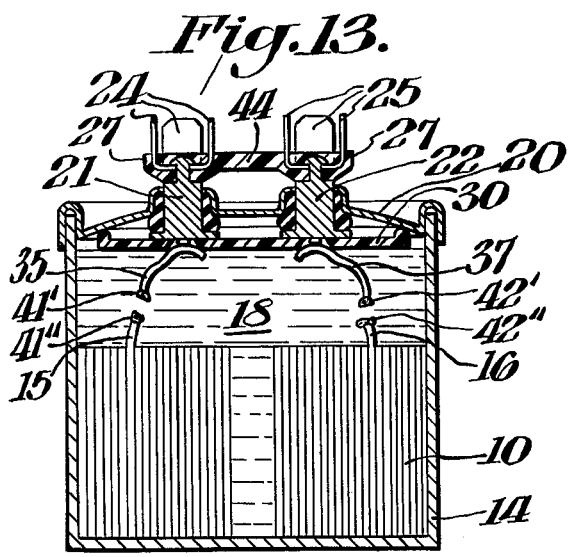
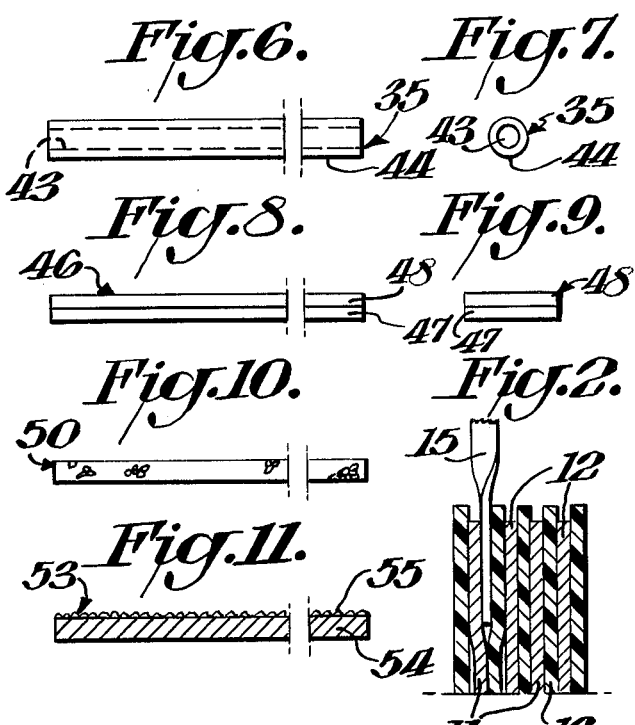
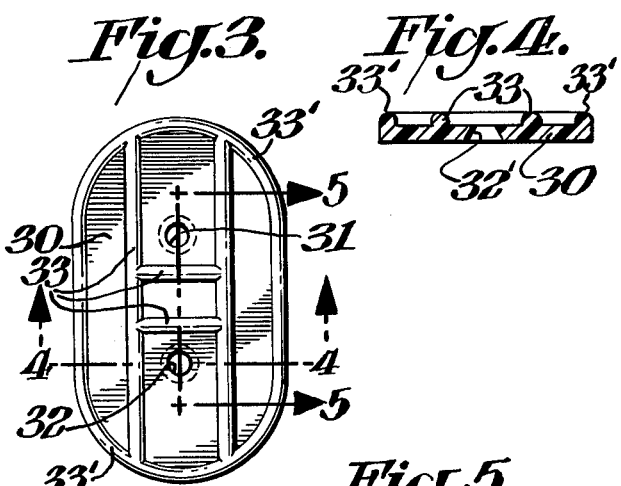
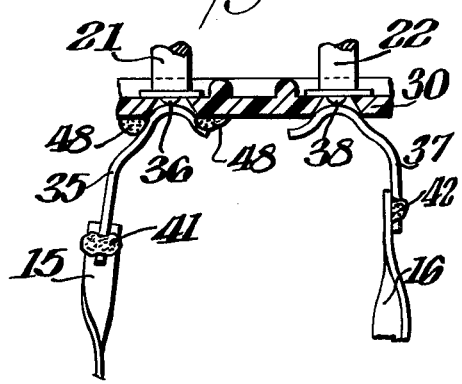

FUSED OIL FILLED CAPACITOR

BACKGROUND OF THE INVENTION

This invention relates to a fused oil filled capacitor and more particularly to such a capacitor wherein the fuse is an exothermically alloyable strand.

Oil filled capacitors are typically employed in a.c. power circuits and when the capacitor fails short, the dielectric oil is heated and expands leading to rupture of the capacitor housing and a sometimes violent spraying of hot oil over adjacent equipment and circuits. Up until recently one of the most preferred dielectric oils are of the class known as polychlorinated byphenols (PCB's), which oils are relatively resistant to combustion. PCB's have been found to cause serious long term effects on the environment and capacitor manufacturers have begun to use non-halogenated oils that do not endanger the environment but that are unfortunately more flamable. It has thus become even more urgent to provide in oil filled capacitors reliable means for preventing the inadvertent introduction of the non-halogenated oils in areas where they may be ignited.

It is known to employ a meltable metal fuse in an oil filled capacitor that will open the connection between at least one of the capacitor terminals and one of the capacitor electrodes when the capacitor section develops a low impedance short. Such fuses melt and open in response to overtemperature of adjacent parts or in response to abnormally high fault currents causing self heating of the fuse.

It is also known to provide in an oil capacitor a circuit interruptor mechanism that senses the degree of distortion in the housing of a faulty capacitor and interrupt the circuit when an unsafe degree of distortion is reached.

However, when the circuit is interrupted by either of the above noted means, the circuit opening or gap is typically very small and arcing ensues across the gap. Such arcing is capable of further heating the faulty capacitor and rupturing the housing.

It is therefore an object of the present invention to provide in an oil filled capacitor an arc suppresion means in combination with a standard circuit interruption protection means.

SUMMARY OF THE INVENTION

An oil filled capacitor includes a capacitor section having two spaced electrodes, a closed housing containing the section, a dielectric oil impregnating the section and essentially filling the housing, an electrical conductor being connected between one of the electrodes and the terminal forming a circuit path therebetween, and a circuit interruptor means for interrupting the circuit path when a fault develops in the section that heats and expands the oil and threatens to burst the housing. The improved oil capacitor of this invention additionally comprises a fuse strand consisting of two exothermically alloyable metal elements being in intimate contact with each other, the fuse strand being a part of the above noted conductor and a portion of the strand being located at the predetermined point of circuit interruption to be effected by the interruptor means.

The location at the point of circuit interruption of the above noted portion of the fuse strand is necessary in order that any arc existing in the circuit gap be directed to the strand, and the concentrated heat of the arc will then kindle the alloyable fuse greatly lenghtening the effective gap and extinguishing the arc.

The characteristic kindling temperature of the exothermically alloyable fuse of this invention corresponds very nearly to the melting temperature of the lowest melting element of the two metal element fuse. The characteristic kindling temperature of an aluminum-palladium fuse is 650° C, approximately the melting point of aluminum. This invention also contemplates a fuse wherein the lowest melting element is an alloy whose composition is chosen to obtain the desired characteristic kindling temperature. In particular the eutectic alloy 70% Al 30% Mg has a melting temperature of 435° C, the aluminum alloys having lesser quantities of magnesium providing a continuous range of melting points from 660° C to 435° C. Also a bi-metallic fuse of palladium and magnesium is advantageously strongly exothermic in alloying. Thus fuses combining palladium with various of the aluminum-magnesium alloys offer a broad range of kindling temperatures. Lower cost fuse pairs, employing only base metals, such as Al/Cu and Al/Ag, though being less exothermic at alloying may also be suitable.

Each metal fuse element should be a solid elongated piece such as a ribbon with the intimate contact extending along the lengths of the elements. One or both of the metal elements may be powder compacts rather than a solid unitary piece. Also the fuse may consist of a homogeneous mixture of particles of one and particles of the other of the two metal elements.

The term kindle as used herein means to initiate alloying of the exothermically alloyable fuse member, leading to a self-sustaining progressive process of exothermic alloying which is characterized by a sputtering and dispersion of molten alloy particles and essentially results in the total obliteration of the fuse.

It is important to recognize that a conventional melting fuse wire that is heated to its melting temperature consumes additional heat energy to change the solid metal into the liquid state (the latent heat of fusion). In contrast, the alloyable fuse of this invention kindles immediately upon reaching its characteristic kindling temperature and completely disintegrates advantageously providing a fast response and reliable protection against arcing at the gap of circuit interruption in the oil filled capacitor of this invention.

BRIEF DESCRIPTION OF THE DRAWING

FIG. 1 shows in side cross sectional view a capacitor of this invention.

FIG. 2 shows a detail of a portion of the capacitor of FIG. 1.

FIG. 3 shows a top view of the plastic plate of the capacitor of FIG. 1.

FIG. 4 shows a detail of the plate of FIG. 3 taken in section 4—4.

FIG. 5 shows a detail of the plate of FIG. 3 taken in section 5—5 together with post portions of the two terminals and conductors leading to the section mounted with the plate.

FIG. 6 shows in side view a fuse wire strand of this invention.

FIG. 7 shows in end view the wire strand of FIG. 6.

FIG. 8 shows in side view a fuse ribbon or strip strand of this invention.

FIG. 9 shows in end view the ribbon strand of FIG. 8.

FIG. 10 shows in side sectional view a powder compact fuse strand of this invention.

FIG. 11 shows in side sectional view a strip and powder fuse strand of this invention.

FIG. 12 shows in side cross sectional view the capacitor of FIG. 1, wherein due to an internal heat and over pressure the housing cover is bulged outwardly interrupting the fuse to terminal connections.

FIG. 13 shows in side cross sectional view a capacitor similar to that of FIG. 1, wherein due to internal heat the capacitor section electrodes to fuse connection is melted and opened.

DESCRIPTION OF THE PREFERRED EMBODIMENTS

A capacitor section 10, as shown in FIG. 1, is made of two aluminum foil electrodes 11 and 12 having a dielectric spacer 13 therebetween as shown in the detail of FIG. 2. The electrodes and spacer are convolutely wound into a roll which is slightly flattened (not illustrated) and fitted into a drawn oval steel can 14 which is electro tin plated. Metal tabs 15 and 16 are connected to electrodes 11 and 12, respectively, and extend away from the section.

An oval steel cover 20, also electro tin plated, is sealed over the open upper end of the metal can 14 forming a closed capacitor housing. The capacitor section is impregnated by a dielectric oil 18 that essentially fills the housing. The dielectric oil 18 is preferably one of the halogen-free synthetic esters described by Ross et al in U.S. Pat. No. 3,855,508 issued Dec. 17, 1974. Two metal terminal posts 21 and 22 are sealed in and insulated from the cover by compressed rubber sleeves 23. The terminal posts 21 and 22 are connected by clusters of metal blades 24 and 25, respectively, which blades are suitable for connection by standard press-on type electrical connectors. The post-blades assemblies are each partially encased in insulative molded resin rings 26 and 27, respectively.

A flexible oval plate 30, as shown in FIG. 3, has two holes 31 and 32 of the same spacing as the terminals 21 and 22. Raised ribs 33 are designed partly to provide the desired stiffness in the plate. The plate 30 is molded polysulfone, having outer dimensions smaller than those of the interior of the oval can 14.

The plate 30 is seated against the bottom of the terminal posts 21 and 22, the holes 31 and 32, respectively being registered approximately coaxially therewith. The peripheral rib 33' is adjacent to and very near or touching the cover 20 so that any significant bulging of the cover causes the peripheral rib 33' to press uniformly against a peripheral and relatively undistorted region of the cover 20. A fuse strand 35 is attached at one end thereof to the terminal post 21 by a joint 36 made essentially in the hole 31. Similarly a fuse strand 37 is attached to the terminal post 22 by a joint 38 made within the hole 32. The other ends of fuse strands 35 and 37 are attached by solder joints 41 and 42, respectively, to the tabs 15 and 16, respectively.

The fuse strands 35 and 37 each consist of an aluminum core wire 43 that is clad with a layer of palladium 44 as shown in FIGS. 6 and 7. The two metals are of approximately equal volume.

An alternative exothermically alloyable fuse strand suitable for use in the capacitor of this invention is the fuse strip 46 illustrated in FIGS. 8 and 9. It consists of a ribbon of aluminum 47 and a ribbon of palladium 48 that are intimately bonded to each other. Referring to FIG. 10, another bimetal fuse 50, which may be substituted for strands 35 and 37, consists of a powder compact that includes a homogeneous mixture of particles of palladium and aluminum. This compact may be held together by an organic binder medium. Yet another suitable alloyable strand 53, shown in FIG. 11, has an aluminum ribbon 54 to which a layer of palladium particles 55 is bonded. The bond may be facilitated by an organic binder or by pressing the powder into the surface of the aluminum.

The open circuited capacitor of FIG. 12 illustrates the interruption of the joints between the terminals 21 and 22 and the fuse strands 35 and 37, respectively, due to over pressure. It is seen that the bulging cover 20 lifts the terminals upwardly while the plate 30 limits the upward movement of the fuse strands, the peripheral rib 33' being stopped against the cover. This circuit interruption mode corresponds to the situation wherein the section 10 has a highly concentrated fault at which the fault current density is high, the local heating and relative expansion of the oil is very great, but the temperature of oil in the regions of the meltable joints 41 and 42 has not yet reached the melting temperature of these joints.

The open circuited capacitor of FIG. 13 illustrates the interruption of the joints between the tabs 15 and 16 and the fuse strands 35 and 37, respectively, due to over temperature of the oil 18. This circuit interruption mode corresponds to the situation wherein the section 10 has a "low grade" fault resulting in a low rate of heat generation in the faulty section leading to a gradual and relatively uniform temperature rise of the oil throughout the assembly. The temperature of the oil has exceeded the melting point of the solder joints 41 and 42 causing them to open. Some of the molten solder 41' and 42' still clings to the fuse strands while the remainder of the molten solder 42" and 42" adheres to the tabs. The open circuited capacitor of FIG. 13 also corresponds to the situation wherein the expansion of the heated oil has not yet caused sufficient bulging of the cover and stress on the strands 35 and 37 to tear them away from the terminals.

Also represented in FIG. 13 is the use of a unitary dual terminal assembly that is similar in all respects to the separate terminals shown in FIGS. 1 and 2, except for the coupling web 44 joining insulator rings 26 and 27. The molded insulator of FIG. 13 is a unitary piece itself including ring portions 26 and 27 and web portion 44. This unitary dual terminal assembly has the advantage that it prevents the twisting of a terminal which may cause the loss of or weakening of the seal of the terminal to the cover. Such twisting may be caused during attachment of connectors and appended heavy conductor buses to the terminal blades 24 and 25.

However, the dual terminal assembly causes a relative stiffening of the cover reducing the sensitivity of the over pressure and mechanical circuit interruptor mechanism. It is thus even more important in such capacitors having a unitary dual terminal assembly to include a meltable circuit link as well as a mechanical over pressure interruptor. It is also clearly even more crucial when using such dual terminal assemblies to include the exothermically alloyable fuse strands of this invention to prevent arcing across the mechanically opened and the melt opened circuit gaps which arcing currents are capable of causing the bursting of the housing.

The terminals are sealed in the cover by inserting the posts 21 and 22 into outwardly flared holes provided in the cover 20 and rolling the flared portions of the cover over the rubber sleeves 23 to effect a seal between each terminal and the cover. The holes 31 and 32 of plate 30 are then registered with the bottoms of the posts 21 and 22 respectively and an end of each fuse strand 35 and 37 is attached through the holes to the posts 21 and 22, respectively. The plate is thereby mounted to the terminal-cover assembly.

The fuse-terminal joint may be made by a carefully controlled d.c. pulse weld step, the energy of the pulse being set low enough to avoid kindling the fuse strand but high enough to make an effective weld joint. A narrow pulse width, e.g. a few milliseconds wide, helps concentrate the heat energy at the junction of the palladium and post without melting the inner aluminum core. Other less critical methods for making this joint include using a solder, such as 60 Sn 40 Pb solder, having a melting point (188° C) greater than the uniform temperature the oil would have to reach to burst the housing, typically for this construction being about 150°. Alternatively this joint may be made by applying a drop of metal powder loaded resin that would subsequently cure at a low temperature or even at room temperature. All of the above methods are effective for joining palladium clad aluminum fuse strands having outer diameters of between 0.002 inch to 0.02 inch (0.005 to 0.051 cm.).

The finer fuse strands, however may, when stressed against the plate 30 due to over pressure and the receding terminal posts, tend to pull through the holes in the plate instead of breaking. To prevent this possibility a small quantity of epoxy or other bonding resin may be applied between the plate and an adjacent portion of the strand. Such a mechanical fastening 48 of the strand to the plate is illustrated in FIG. 5 in two places between plate 30 and strand 35.

The assembly including terminals, cover, plate and fuse strands is held over the capacitor section. Low melting solder joints 41 and 42 are made between the tinned copper tabs 15 and 16 and the fuse strands 35 and 37 respectively. The low melting solder employed consists of 58 Bi 42Sn having a melting temperature of 138° C.

The next steps include inserting the section 10 into the can 14, sealing the cover to the open upper end of the can by roll crimping and soldering, and impregnating the section. This last step is accomplished by the well known method of submersing the whole assembly in a tank containing the dielectric oil, admitting oil to the inside of the housing through a fill hole therein (not shown), drawing a vacuum in the tank and sealing the fill hole in the housing while still submersed.

Various modifications in the above described capacitor structure may be made that retain the essential arc suppression feature provided by the exothermically alloyable fuse strand. For example, the strand 35 to terminal post 21 connection may be made using the low melting solder that served as the meltable strand tab joint 41. The other end of the strand may then be crimp connected by the tab, or of course welded or soldered by a higher temperature solder, e.g. 60 Sn 40 Pb. It is also noteworthy that whether the strand-terminal joint breaks or whether the strand itself breaks due to over pressure, any arc existing in the resulting circuit gap will be to the strand itself, which condition is necessary for reliable arc suppression.

What is claimed is:

1. An oil filled capacitor including a capacitor section having two spaced electrodes, a closed housing containing said section, a dielectric oil essentially filling said housing, at least one through type terminal being mounted in a wall of said housing, an electrical conductor being connected between one of said electrodes and said terminal forming a circuit path therebetween, and a circuit interruptor means for interrupting said circuit path when a fault develops in said section that heats and expands said oil and threatens to burst said housing; the improvement comprising in addition a fuse strand consisting of two exothermically alloyable metal elements being in intimate contact with each other, said fuse strand being a part of said conductor and a portion of said strand being located at the predetermined point of circuit interruption to be effected by said interruptor means.

2. The capacitor of claim 1 wherein said two elements are aluminum and palladium respectively.

3. The capacitor of claim 1 wherein each of said elements is an elongated piece, said intimate contact extending along the length of said elements.

4. The capacitor of claim 3 wherein one of said metal elements is a wire and the other of said elements is clad over said wire.

5. The capacitor of claim 3 wherein each of said elongated elements is in the form of a ribbon.

6. The capacitor of claim 1 wherein said strand comprises an elongated powder compact being a homogeneous mixture of particles of one and particles of the other of said elements, respectively.

7. The capacitor of claim 1 wherein one of said elements is in the form of an elongated piece and the other of said elements is a powder being bonded to a surface of said one element.

8. A fused oil filled capacitor comprising a closed housing; a capacitor section within said housing, said section having a pair of sheet electrodes, and a dielectric spacer between said electrodes; a dielectric oil impregnating said section and essentially filling said housing; at least one terminal passing through a wall of said housing; an electrical conductor being connected between one of said electrodes and said terminal forming a circuit path therebetween; a mechanical circuit interruptor means for mechanically interrupting said circuit path at a predetermined point along said conductor when an over pressure within said housing causes a predetermined degree of bulging in said housing; a strand of an exothermically alloyable fuse consisting of two metal elements in intimate contact with each other, said strand being a part of said conductor and said predetermined point of interruption being located at a point along said strand.

9. A fused oil filled capacitor comprising a closed housing; a capacitor section within said housing; said section having a pair of sheet electrodes, and a dielectric spacer between said electrodes; a dielectric oil impregnating said section and essentially filling said housing; at least one terminal passing through a wall of said housing; an electrical conductor being connected between one of said electrodes and said terminal forming a circuit path therebetween; a strand of an exothermically alloyable fuse consisting of two metal elements in intimate contact with each other, said strand being a part of said conductor, a joint by which said strand is connected within said circuit path consisting of solder having a melting temperature lower than the elevated temperature of said oil which would cause the bursting of said housing.

10. The capacitor of claim 1 wherein said elements are, respectively, palladium and an alloy of aluminum and magnesium.

11. The capacitor of claim 10 wherein said alloy is the entectic alloy 70% Al 30% Mg, whereby the kindling temperature of said fuse is about 435° C.

12. The capacitor of claim 9 wherein said elevated temperature is about 150° C.

13. The capacitor of claim 12 wherein said solder consists of the alloy 58% Bi 42% Sn having a melting temperature of 138° C.

14. The capacitor of claim 8 wherein said oil is a halogen-free synthetic ester.

15. The capacitor of claim 9 wherein said oil is a halogen-free synthetic ester.

* * * * *